(No Model.)
S. D. FIELD.
REGULATOR FOR ELECTRIC CURRENTS.
No. 374,404. Patented Dec. 6, 1887.
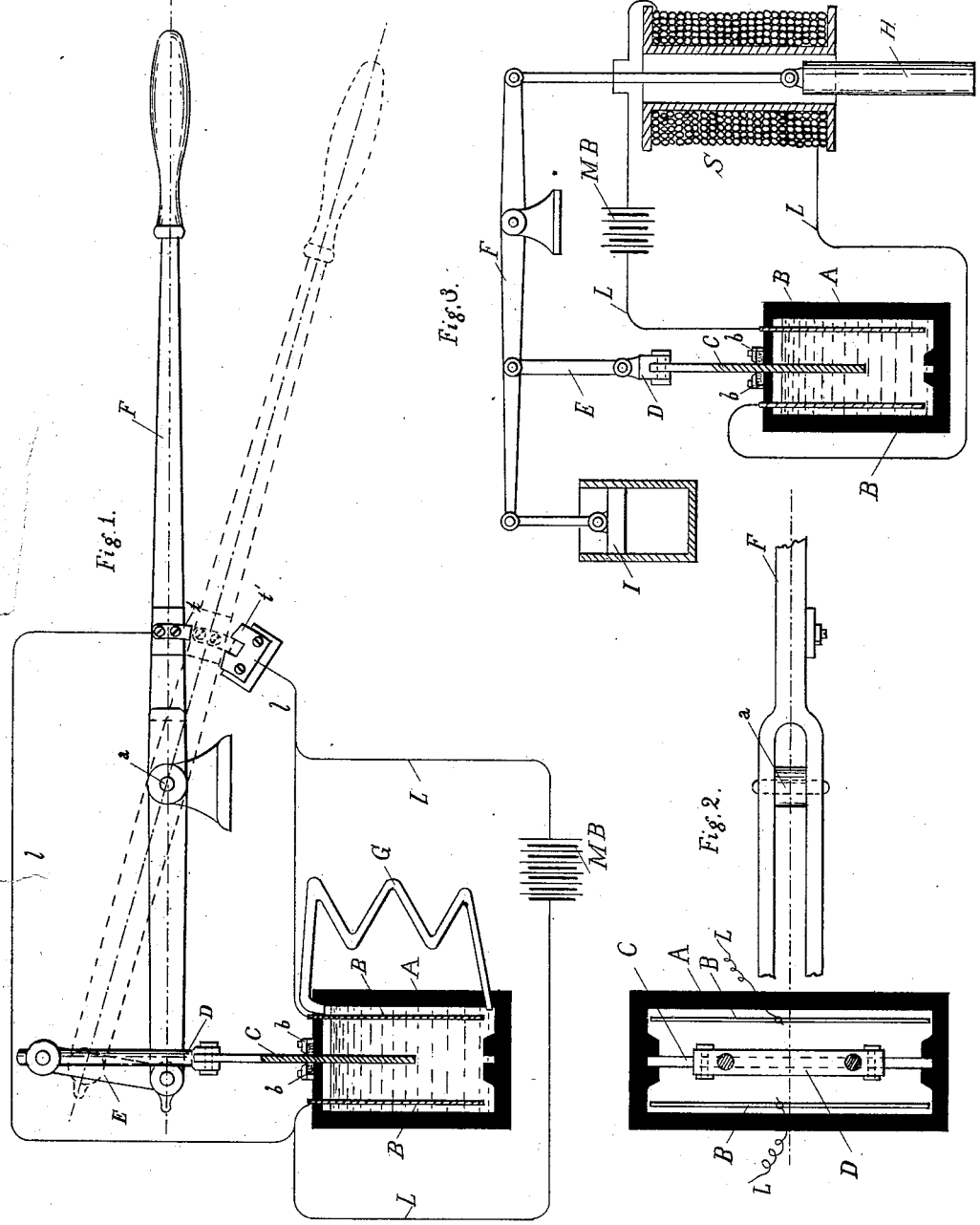
WITNESSES
E. L. French
David E. Lain
INVENTOR
Stephen D. Field
By Foster & Fowler Attys

UNITED STATES PATENT OFFICE.

STEPHEN DUDLEY FIELD, OF YONKERS, NEW YORK.

REGULATOR FOR ELECTRIC CURRENTS.

SPECIFICATION forming part of Letters Patent No. 374,404, dated December 6, 188·

Application filed March 17, 1887. Serial No. 231,253. (No model.)

*To all whom it may concern:*

Be it known that I, STEPHEN DUDLEY FIELD, a citizen of the United States, residing at Yonkers, in the county of Westchester and State of New York, have invented certain new and useful Improvements in Switches and Regulators for Electric Currents, of which the following is such a full, clear, and exact description as will enable any one skilled in the art to which it appertains to make and use the same, reference being had to the accompanying drawings, forming part of this specification.

The object of my invention is to control an electric circuit in a very simple manner, to regulate the resistance of the same effectually and gradually, and to interrupt the circuit without producing any spark.

The invention consists of an electrolyte contained in a suitable receptacle having conducting-plates immersed therein connected with the circuit, which plates are preferably made of non-oxidizable material with a non-conductive plate, which is adapted to be interposed between the conducting-plates to any extent desired, so as to cut off the current entirely or to interpose as much resistance in the circuit as required. The means for raising and lowering said non-conductive plate may be arranged for manual manipulation, or may be controlled automatically by the current itself.

The invention consists, also, in an arrangement connected with the vessel containing the electrolyte, for the purpose of heating the apartments where the invention is used, utilizing the heat produced by the current passing through the electrolyte for this purpose, which would be otherwise wasted; and it consists, also, in the details of construction, which will be hereinafter pointed out and claimed.

In the accompanying drawings, forming part of this specification, Figure 1 represents a side elevation of an apparatus embodying my invention, with a diagrammatic view of the circuits; Fig. 2, a plan view of the same; and Fig. 3, a side view of a modification of my invention, with a diagrammatic view of the circuits.

The same letters are used throughout the three figures of the drawings to indicate the same or corresponding parts.

A represents a box of non-corrosive and non-oxidizable material, which may be made of rubber, glass, or any other material; or the same may be constructed of wood and lined with some such material.

B B are two conducting-plates which are immersed in an electrolyte or conducting-fluid contained within the vessel A. The conductive plates may form the lining of the box A, if desired.

By the term "electrolyte" used herein I mean any conductive fluid not possessing too much viscosity whose molecules possess such mobility as not to resist too strongly the movement of the non-conductive plate to be now described. I wish, however, to state that I do not limit myself to any particular conducting-fluid, but prefer the use of acidulated water. In this fluid, between the plates B B, I place a plate, C, of glass or any other insulating material, which should preferably be of non-oxidizable material. To this plate is bolted a frame-piece, D, connected by a link, E, with a lever, F, pivoted at $a$. This plate G works in a groove cut in the box when made of rubber, or in a groove lined with rubber, as the case may be, and may be provided with packing $b$ $b$ on the top of the box.

The source of energy M B is connected by the main line L L to the two plates B B, the opposite terminals of the battery being connected each to one of the plates. The circuit $l$ $l$ is connected around the circuit of the main line L L. This circuit $l$ $l$ remains open at all times except when the terminal $t$ upon the lever F catches into the terminal $t'$, connected with the opposite source of electricity. When the terminals $t$ and $t'$ come together, the resistance-box is entirely short-circuited, and the current passes from the generator to the main line L, over the circuit $l$ $l$ to the main line again and to the opposite electrode.

It will be seen from the construction described that the plate C may be interposed between the terminal plates B B, so as to make the resistance anything desired. When placed at its lowest point, it will gradually and entirely cut off the current without producing the least spark. When raised, it will gradually decrease the resistance of the circuit until the plate reaches its highest point, when the resistance will gradually become the least, (features which cannot be overestimated in operating electric motors,) and upon any further movement of the lever the terminals $t\ t'$ will come together and entirely short-circuit the apparatus.

In practice I design to have the plates B B located at about half an inch apart, so as not to make the resistance too great. The plates may be connected with independent and opposite sources of electricity, the other electrodes of which are grounded; but this of course is obvious.

Connected to the vessel A is a coil of pipe, G, the one end opening into the upper part of the conducting-fluid and the other end into the lower part, so as to afford a ready circulation of the fluid in the pipe. This pipe should be made of non-corrosive material where a very acid solution is used, the material of it being regulated by the electrolyte employed. It may be disposed in any manner desired, and affords means for heating purposes, which means utilize heat that would otherwise be wasted, and does not in any way draw upon the available source of power, but uses a waste product only.

In Fig. 3 I have shown an apparatus embodying a modification of my invention. Here a solenoid, S, is interposed in the working-circuit, and governs automatically the resistance thereof by raising or lowering the plate C through the instrumentality of the lever F and the core H. Should the resistance of the circuit fall from any cause, the current would increase in the solenoid S and draw up the core H, thus depressing the plate C and causing the resistance to increase and the resistance of the entire circuit to be brought back to what it was before, so that where more power-consuming devices are in the circuit of the line the resistance of the regulator A B C will be automatically lessened, and when less power-consuming devices are in the circuit the resistance thereof will be increased, so that the device will automatically maintain the potential the same under varying conditions. I place a dash-pot, I, at the end of the lever F, so as to steady the movements of the same and prevent any sudden movement of the parts.

The automatic arrangement described may be used in any connection where it is designed to regulate the current, and I do not confine its use to any specific kind of apparatus.

Having now fully described my invention by setting forth devices embodying the same, I wish to have it understood that I do not limit myself to the construction described, as the same may be varied in many ways without departing from the scope thereof; and I reserve to myself all changes that fall within this limit and the right in practice to make any changes I see fit that come within the scope of what I now desire to claim and secure by Letters Patent of the United States, which is—

1. An electric switch or regulator for electric currents, consisting of a conducting-fluid, two conducting-plates immersed therein and separated from each other, each connected with a positive or negative source of electricity, a suitable receptacle for said fluid, and a non-conductive plate adapted to be inserted between said conductive plates, so as to entirely shut off or interpose more or less resistance to the current.

2. The combination of the following devices, constituting together an electric switch or regulator for currents of electricity, to wit: a vessel containing a conducting-fluid, two non-oxidizable conducting-plates placed therein, with a section of said fluid between them, said plates constituting the terminals of an electric circuit, an insulating medium adapted to be placed between said plates in the fluid, and means for operating said medium.

3. As a means for controlling an electric circuit, two conducting-bodies forming the terminals thereof, a conductive fluid interposed between the same, and an insulating-body adapted to pass through said fluid between said conducting-bodies, so as to interpose a greater or less area of fluid for the current to pass through, and thus regulate the resistance of said circuit.

4. The combination of a conducting-fluid, two plates arranged contiguously within the same, forming the positive and negative terminals of a source or sources of electricity, means co-operating therewith for regulating the resistance of said circuit, and a coil of pipe or other means opening into said fluid, and allowing a circulation of the same therein for utilizing the heat developed in said fluid by the passage of the current of electricity, for the purpose specified.

5. The combination of two metal plates placed in a conductive fluid, connected with a positive and negative source of electricity and separated from each other, so as to cause the current to pass through said fluid, a plate of insulating material adapted to be placed in said fluid between the plates to a greater or less extent to regulate the resistance or cut off the circuit, means for operating said plate, and a cut-out or short circuit around said plates operated by the means for controlling said plate.

6. The combination of the vessel A, containing a conductive fluid, two conducting-plates, B B, immersed therein, connected with a supply-circuit, a metal plate, C, of insulating material, adapted to be placed to a greater or less extent in the fluid between the plates, so as to regulate the resistance or cut off the flow of electricity, a lever, F, for manual operation, and means connecting said lever to the aforesaid insulating-plate, for the purpose described.

7. The combination of the vessel A, containing a conducting-fluid, plates B B therein, connected with a positive and negative source of electricity, a groove cut within said vessel and lined with insulating material, an insulating-plate sliding therein, for the purpose described, a lever, as F, and intermediate mechanism for controlling said insulating-plate and cut-out circuit $l$ around the plates, which circuit is completed by a contact located upon said lever.

8. The combination of the box A, containing a conducting-fluid, two plates, B B, interposed therein, connected with a source, M B, of electricity, a plate, C, of insulating material, placed between the same within the fluid, for the purpose described, means for controlling the same, and a coil of pipe, as G, connected in the manner described, for the purpose set forth.

9. The herein-described method of varying the strength of an electric current, which consists in varying the section of a fluid-conductor between two conducting-bodies immersed therein by interposing more or less of a non-conducting medium in the fluid between said bodies.

10. The herein-described method of varying the strength of an electric current, which consists in varying the section of a fluid-conductor in the circuit thereof and short-circuiting said fluid-conductor from the circuit when the section is the greatest.

11. The combination, with an electric circuit, of a fluid-resistance and a system of radiating pipes, whereby any heat due to the action of the current upon said resistance may be carried away and utilized at any given point.

In testimony whereof I have hereunto set my hand and seal, this 15th day of March, 1887, in the presence of two subscribing witnesses.

STEPHEN DUDLEY FIELD. [L. S.]

Witnesses:
A. C. FOWLER,
CHAS. D. FOWLER.